Jan. 4, 1949.  A. J. KORODY  2,457,905
FUEL TANK INDICATOR
Filed April 10, 1947
Fig. 1.
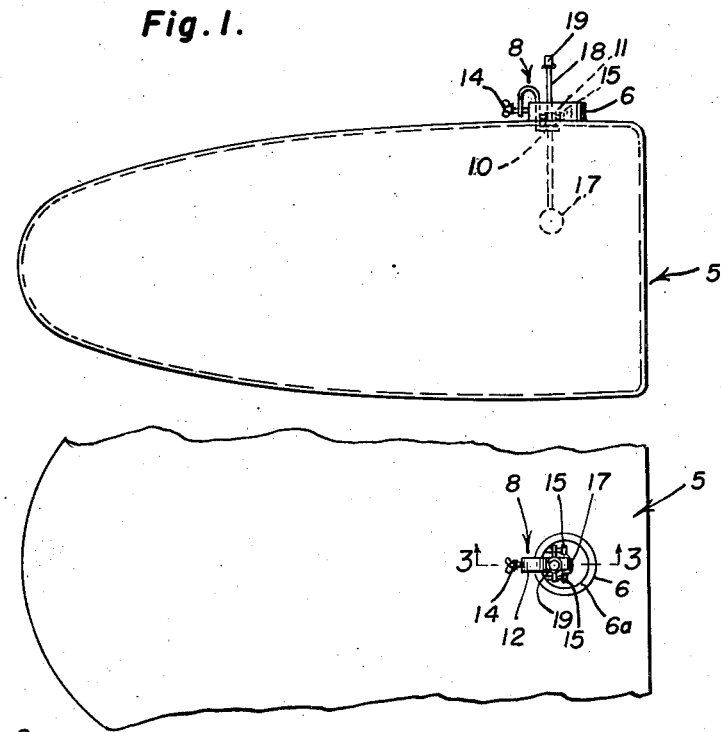
Fig. 2.
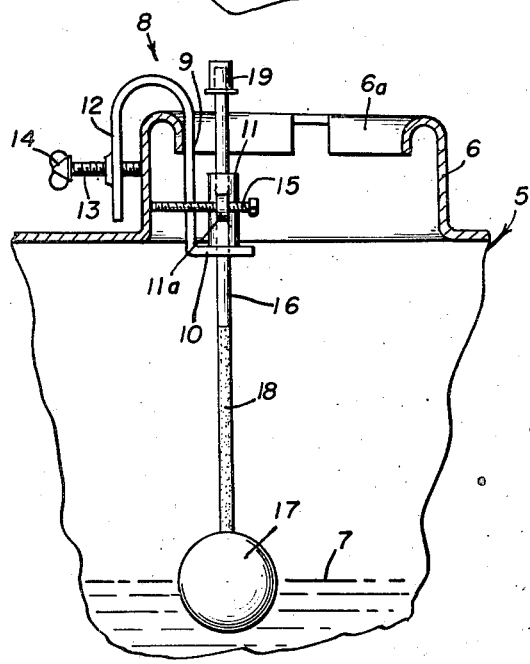
Fig. 3.
Inventor
Arthur J. Korody
By
*Attorneys*

Patented Jan. 4, 1949

2,457,905

UNITED STATES PATENT OFFICE 2,457,905

FUEL TANK INDICATOR

Arthur J. Korody, Cardington, Ohio

Application April 10, 1947, Serial No. 740,667

2 Claims. (Cl. 73—322)

This invention relates to a liquid level indicator which is expressly adapted to be used in a tractor fuel tank in a manner to minimize the likelihood of overfilling said tank.

In certain areas, particularly farming districts, tractor fuel tanks are replenished from fuel supply tanks such as are carried on skids or sleds, these ranging from 150, 200 and 300 gallons capacity. Such supply tanks are often operated by hand pump. Experience has shown that the filling of a tractor fuel tank from one of these supply tanks is such that it is difficult to keep an eye on the filling step and consequently the level of the fuel in the tractor tank rises and overflows before the attendant notices it.

With the foregoing objectionable difficulties in mind, I have found it expedient and practicable to employ a simple type liquid level indicator which may be used during the filling step and which is sufficient to put the attendant on notice when the level in the tractor fuel tank has reached a potential overflow level.

Briefly, the preferred embodiment of the invention is characterized by an adaptor bracket detachably mounted on the tractor fuel tank by way of the filler neck, said bracket being constructed to accommodate a float equipped rod, the rod being such as to disclose a red "danger signal" when the desired liquid level in the tank has been reached.

Other objects, features and advantages will become more readily apparent from the following description and the accompanying illustrative drawings.

In the accompanying sheet of drawings, wherein like numerals are employed to designate like parts throughout the views:

Figure 1 is an end elevational view of a conventional type tractor fuel tank equipped with the improved liquid level indicator;

Figure 2 is a fragmentary top plan view based on Figure 1; and

Figure 3 is an enlarged vertical sectional view taken on the central vertical line 3—3 of Figure 2, looking in the direction of the arrows.

Referring now to the drawings by distinguishing reference numerals, the tractor tank is denoted by the numeral 5 and is provided with the customary filler neck 6 which, in practice, is closed by an appropriate cap (not shown). The fuel level in the tank is indicated at 7.

The adaptor bracket, a part of the invention, is denoted by the numeral 8 and is of general U-shaped form, the inner limb 9 thereof resting in limited contact with the inner periphery of the downturned lip 6a, the lower portion being spaced from the neck proper and being provided on its lower end portion with a right angularly disposed foot 10 centrally apertured and carrying an upstanding guide and retention sleeve 11. The outer limb 12 is provided with a set-screw 13 engageable with the exterior surface of said neck 6, said set-screw having a thumb-piece 14 for convenience of use. The sleeve 11 is also provided with diametrically opposite ears 11a carrying set-screws 15 which engage the inner periphery of said neck to hold the bracket 8 in a fixed position.

The float rod 16 is provided on its lower end with a float 17 which rises and falls with the fuel level 7. The lower half portion of the rod is preferably painted or otherwise colored red, as at 18, and this constitutes a "danger signal" when it appears above the top of the filler neck 6. On the upper end of the rod is a flanged stop collar 19. It will be observed that the diameter of the flange on the collar or cap 19 is such that it engages the upper end of the sleeve 11 to limit the downward sliding movement of the rod and to prevent the rod from slipping down into the tank by way of said sleeve.

The drawings show the construction and mode of attachment and assemblage of parts. The invention is of such simplicity that these phases of the matter are considered substantially self-evident.

It is evident that when the fuel tank 5 is being filled from a supply tank on a skid or sled (not shown) when the fuel level rises to a distance within the position of the filler neck, the "danger signal" on the float rod comes to view and thus warns the attendant, the operator of the pump on the supply tank, that sufficient fuel is on board. Hence, there is little likelihood of accidentally overflowing the tractor fuel tank.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. An indicator attachment for the filler neck of a conventional-type tractor fuel tank comprising a U-shaped bracket of a size to straddle a filler neck on said tank, the outer limb of said bracket being provided with a set screw adapted to engage the outer side of said filler neck, the inner limb of said bracket having a laterally directed portion forming a foot, said foot being apertured and provided with an aligned upstanding sleeve constituting a guide, said sleeve having set screws also engageable with said neck, an indicator rod slidable in said sleeve, said rod having a float on its lower end, and a flanged cap on the upper end.

2. An indicator attachment for a tractor type fuel tank filler neck comprising a U-shaped bracket, said bracket being of a size to arch over and straddle a portion of said filler neck, the outer limb of said bracket being provided with set screw releasably engageable with the outer surface of said filler neck, the inner limb of said bracket having its terminal laterally directed and providing a foot, said foot being apertured and having a sleeve lined up with said aperture and rising vertically from the foot, said sleeve constituting a guide member, said sleeve being provided on diametrically opposite sides with outstanding ears having screw-threaded holes, and set screws threaded through said holes, said set screws being on diametrically opposite sides of the sleeve and engageable with the inner surface of said filler neck, an indicator rod slidable through said sleeve, and a float on said rod.

ARTHUR J. KORODY.

REFERENCES CITED

The following references are of record in the file of this patent:

UNITED STATES PATENTS

| Number | Name | Date |
|---|---|---|
| 690,936 | Dyer | Jan. 14, 1902 |
| 1,191,667 | Charpentier | July 18, 1916 |
| 2,189,236 | Watson | Feb. 6, 1940 |

FOREIGN PATENTS

| Number | Country | Date |
|---|---|---|
| 23,921 | Austria | Apr. 25, 1906 |